United States Patent [19]
Wirodihardjo et al.

[11] Patent Number: 5,772,187
[45] Date of Patent: Jun. 30, 1998

[54] APPARATUS FOR COOLING AND PROCESSING A MOLTEN PRODUCT INTO A GRANULATE PRODUCT

[75] Inventors: Abimanjoe Saroso Wirodihardjo, Hellevoetsluis; Wijnand Jacob 't Hart, Waddinxveen; Alwin Graafland, Moordrecht, all of Netherlands

[73] Assignee: Goudsche Machinefabriek B.V., Netherlands

[21] Appl. No.: 727,410

[22] PCT Filed: Apr. 18, 1995

[86] PCT No.: PCT/NL95/00138
§ 371 Date: Jan. 24, 1997
§ 102(e) Date: Jan. 24, 1997

[87] PCT Pub. No.: WO95/28226
PCT Pub. Date: Oct. 26, 1995

[30] Foreign Application Priority Data
Apr. 18, 1994 [NL] Netherlands .......................... 9400618

[51] Int. Cl.⁶ .................................................. C21C 1/00
[52] U.S. Cl. .......................... 266/241; 164/423; 164/429; 164/443; 164/479
[58] Field of Search ................................... 266/190, 241; 164/423, 429, 443, 479

[56] References Cited

U.S. PATENT DOCUMENTS

| | | | |
|---|---|---|---|
| 2,910,744 | 11/1959 | Pond | 164/423 |
| 3,642,053 | 2/1972 | Wiley et al. | 164/429 |
| 5,067,554 | 11/1991 | Bosswell et al. | 164/463 |

*Primary Examiner*—John Sheehan
*Attorney, Agent, or Firm*—Varnum, Riddering, Schmidt & Howlett LLP

[57] ABSTRACT

An apparatus for cooling and processing a molten product into a granulate product which apparatus comprises a displaceable support consisting of at least one substantially horizontal, disk-shaped element arranged for rotation about a substantially vertical shaft, means for depositing the molten product on the support, cooling means containing cooling liquid channels closed in themselves that form part of the disc-shaped element and, without connection with the environment, connect to feed and discharge means, and means for removing the molten product from the support in granulate form. Preferably, a double spiral-shaped channel is present per disk-shaped element, and the means for depositing the molten product on the support comprise a dispenser adapted to dispense the molten product batchwise or dropwise.

20 Claims, 3 Drawing Sheets

APPARATUS FOR COOLING AND PROCESSING A MOLTEN PRODUCT INTO A GRANULATE PRODUCT

BACKGROUND OF THE INVENTION

1. Field of the Invention

The invention relates to an apparatus for cooling and processing a molten product into a granulate product, said apparatus comprising:

- a support consisting of at least one substantially horizontal, disk-shaped element, arranged for rotation about a substantially vertical shaft,
- means for depositing the molten product on each disk-shaped element of the support,
- cooling means for cooling the support, and
- means for removing the solidified product from the support in granulate form.

2. Background Art

Such an apparatus is known from U.S. Pat. No. 4,500,349 and is intended for producing a salt-coated metal granulate. The means for depositing the molten product provide this product on the support in a thin layer. After the product has solidified, it is removed from the support with a scraper, and the solidified product is broken and crumbled to obtain the desired granulate form. This may lead to dust formation, which may necessitate the provision of an enveloping case.

For solidifying the product, the support is cooled at the upper and lower sides by means of a fluid passing over the product and the support in gaseous form. It has also been proposed to cool the lower side of the support by means of a liquid to be jetted against it. In a number of cases, direct contact between product and coolant will not be allowed or will necessitate the use of an expensive inert gas. A liquid coolant will be able to evaporate and thus contact the product, which involves limitations to the products to be processed.

DE-B-1 005 533 discloses an apparatus for the production of granulates from a molten material, said apparatus comprising an inclined disk-shaped element with cooling liquid channels closed in themselves and connected to feed and discharge means for cooling liquid without connection to the environment.

SUMMARY OF THE INVENTION

The object of the invention is to improve an apparatus of the type described in the opening paragraph in such a manner that with a compact apparatus any product can be processed with a minimum of dust formation problems and with good cooling possibilities without the risk of contact between processed product and coolant.

In accordance with the invention, this is realized in that the cooling means comprise per disk-shaped element two interlocking, spiral-shaped cooling liquid channels closed in themselves that form part of the disk-shaped element, each spiral-shaped channel having an outer end and an inner end, and one spiral-shaped channel having an inlet for cooling liquid located adjacent its outer end and an outlet for cooling liquid located adjacent its inner end, whereas for the other spiral-shaped channel this is the other way round, with feed and discharge means for the cooling liquid extending centrally through the disk-shaped element, said channels being connected to said feed and discharge means without connection to the environment. By virtue of these features, the advantages of a horizontal supporting face and a completely closed cooling system are combined by opting for a rotating horizontal displacement, the disk-shaped support being provided with internal cooling channels, i.e. a closed cooling system instead of spray nozzles. The disk-shaped design of the support also means a relatively compact construction that, partly due to the closed cooling system, can readily be provided with a casing, if desired, for instance because the solidification of the molten product involves formation of gases that should be kept from the environment, or for instance because an oxygen-sensitivity of the product requires operating in an inert atmosphere. By the interlocking configuration of the cooling channels, the continuous flow-through of the cooling channels can be realized in a relatively simple manner. Further, it is not only possible to optimally cover the surface of the disk-shaped element, but also to effect a maximally uniform change of cooling temperature throughout the surface by feeding the two channels in counterflow. In this connection, in accordance with a further embodiment of the invention, it is preferred that the inlets as well as the outlets of the two channels connect to an annular channel in the vertical shaft.

The provision of cooling channels in the support can be realized in many known manners. In accordance with a further embodiment of the invention, it is particularly preferred that the support is composed of a disk-shaped supporting platform and a thin plate attached locally to the lower side thereof, which plate, after attaching, is bulged by pressurizing by means of a fluid the space between the supporting platform and the thin plate in the regions between the local attachments, while the thin plate is preferably attached to the supporting platform through laser welding. In this manner, the above-mentioned spiral shape of the cooling channels can be realized in a relatively simple manner.

If a uniform granulate is desired, it is preferred that the means for depositing the molten product on the support comprise a dispenser adapted to dispense the molten product batchwise or dropwise. If the support is designed as an annular element, then, in accordance with a further embodiment of the invention, the dispenser is preferably designed so as to be capable of dispensing the molten product in sectors.

As is already observed hereinabove, the application of a disk-shaped element as support has the advantage of a compact constructional form. This advantage will manifest itself considerably more if, in accordance with a further embodiment of the invention, the support consists of a number of disk-shaped elements, vertically arranged one above the other, each comprising cooling channels, disperser means and means for removing the solidified product in granulate form. Thus, a relatively large treating surface can be realized in a relatively small space, which has the further advantage that, if so desired, the support can be surrounded by a casing shutting off this support from the environment, which casing has a fairly small size.

BRIEF DESCRIPTION OF THE DRAWING

The cooling and processing apparatus according to the invention will be further discussed hereinafter with reference to an exemplary embodiment shown in the accompanying drawings. In these drawings.

DETAILED DESCRIPTION

Figure 1:
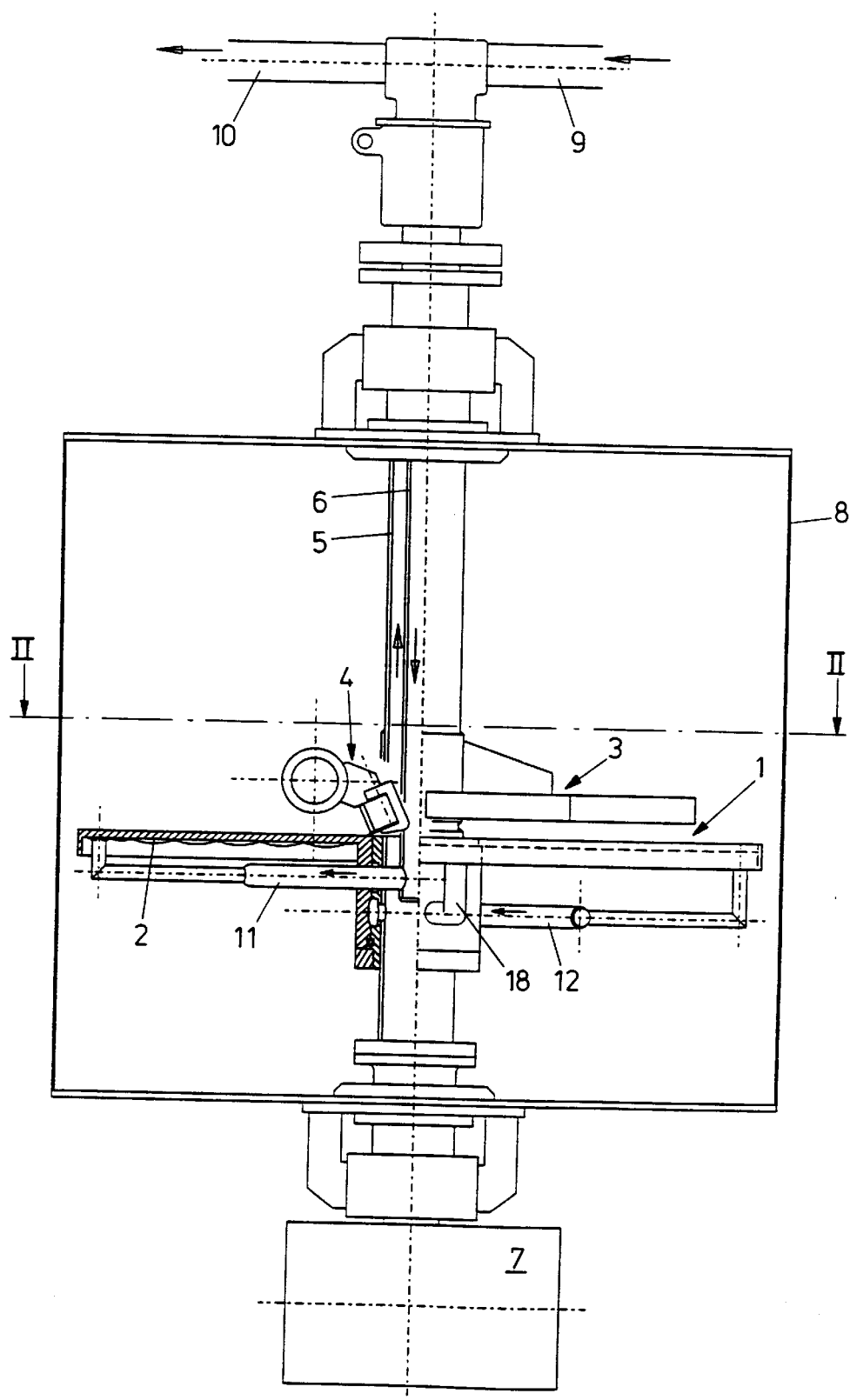
FIG. 1 shows, partly in elevation and partly in section, an apparatus according to the invention.

The apparatus shown in FIG. 1 comprises a support 1 having cooling channels 2, a dispenser 3 and a scraping device 4. The support 1 is mounted on a hollow shaft 5, wherein a second hollow shaft 6 extends concentrically. The assembly of the shafts 5 and 6 and the support 1 is accommodated in a fixedly arranged encasing 8 so as to be rotatable by means of a driving gear 7. The hollow shaft 5 further carries the dispenser 3 mounted so as to be pivotable to and fro through a specific path around the shaft 5 by driving means not further shown. Via a coupling, the rotatable, hollow shaft 6 is connected with a fixedly disposed coolant supply 9, while the annular space between the jointly rotatable shafts 5 and 6 communicates, via a coupling, with a fixedly disposed coolant drain 10. Coolant fed via the hollow shaft 6 is passed to the cooling channels 2 by means of an annular channel and a feed line 11 or 26 connecting thereto, and returned, via a discharge line 12 or 18, to an annular channel communicating with the annular hollow space between the shafts 5 and 6.

Figure 2:
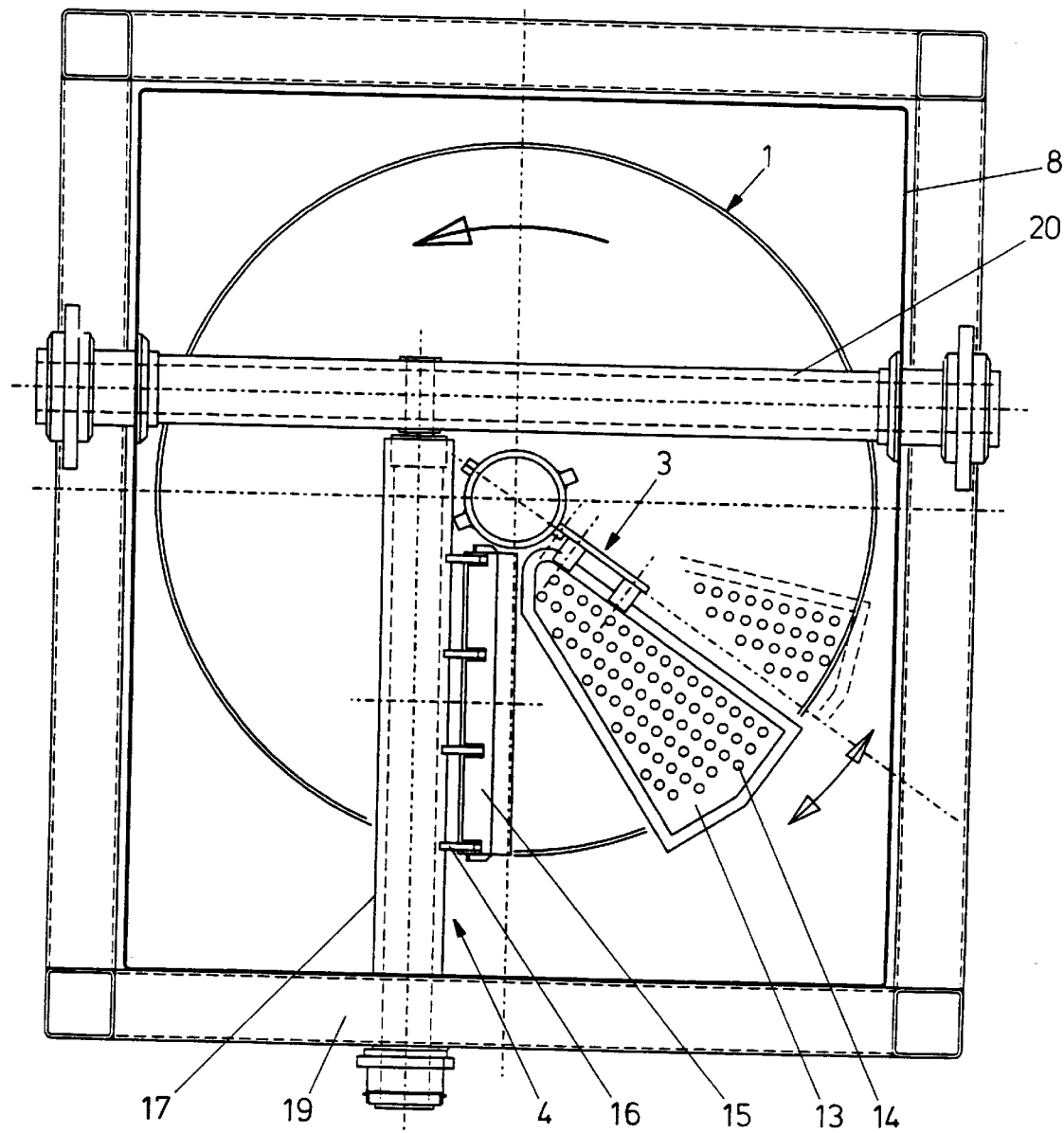
FIG. 2 shows a section taken on the line II—II in FIG. 1.

In the top plan view shown in FIG. 2, the positions of the dispenser 3 and the scraping device 4 are further explained. The dispenser 3 comprises a dispensing member 13 in the form of a sector of a circle. The dispensing member 13 comprises a large number of dispensing openings 14, enabling a sector of the support 1 to be supplied, in one operation, with a molten product to be processed, deposited batchwise in a particular pattern. By pivoting, during the depositing operation, the dispensing member 13 at an angular speed that is the same as the speed at which the support is rotated and pivoting the dispensing member back after the product has been deposited, the support 1 can keep rotating continuously and, accordingly, the apparatus can keep operating continuously with a support that is always optimally covered with product.

The scraping device 4 comprises a blade carrier 15, connected with a carrying tube 17 by ears 16. One extremity of the carrying tube 17 is bearing-mounted in a rectangular frame 19 located outside the fixedly disposed encasing 8, which frame 19 is left out in FIG. 1, while the other extremity finds support in a shaft 20, which is in turn supported by the frame 19 again.

Figure 3:
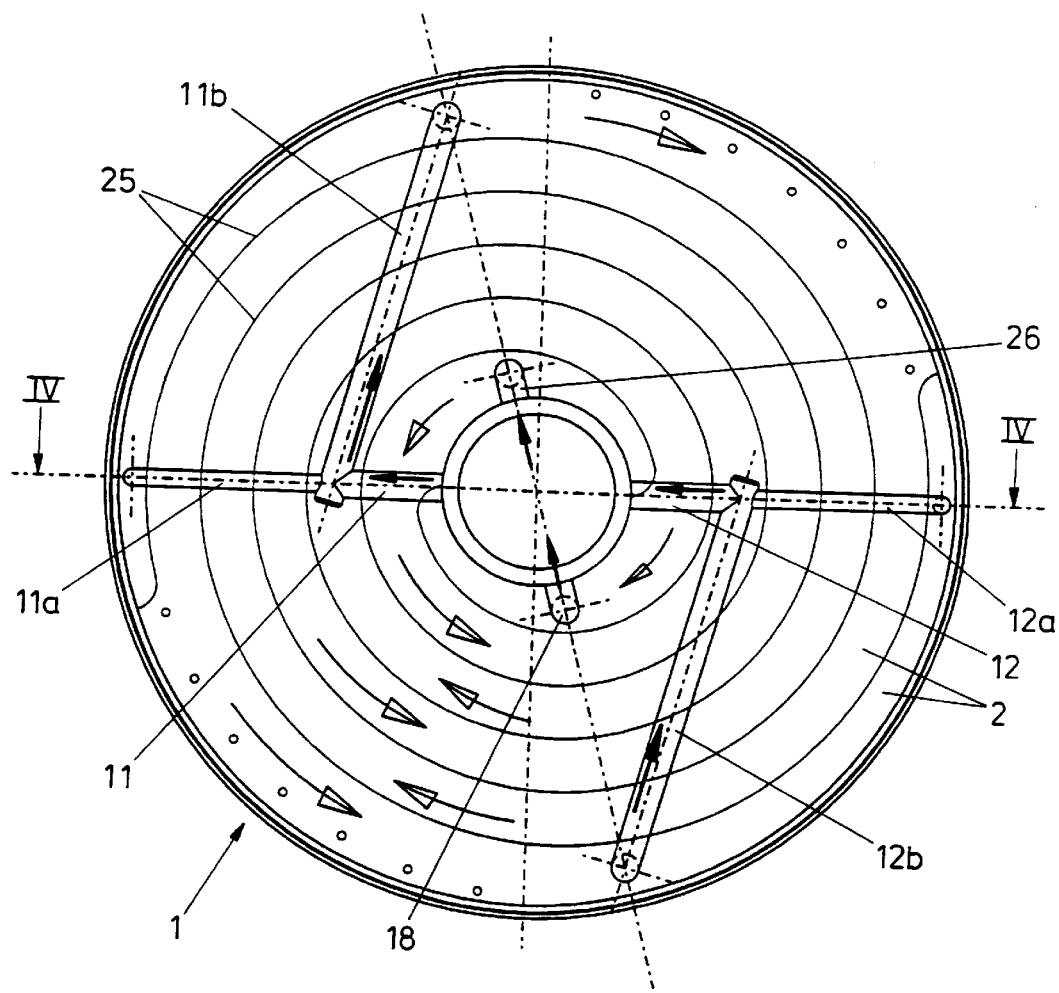
FIG. 3 shows, in bottom view, a support applied in the apparatus according to FIG. 1.
Figure 4:
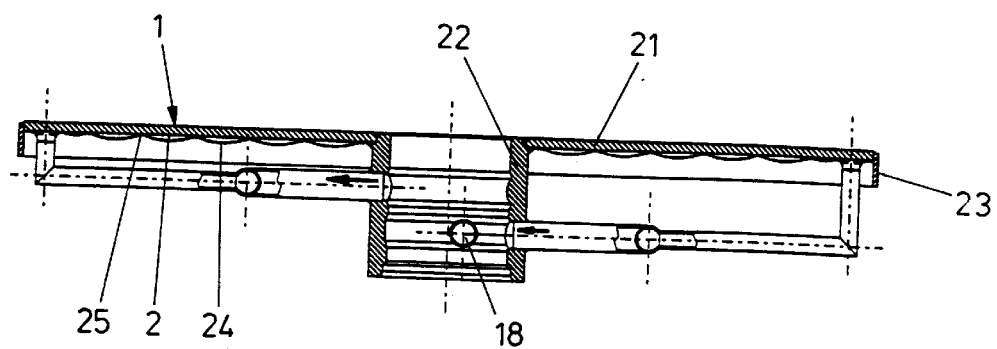
FIG. 4 shows a section taken on the line IV—IV in FIG. 3.

FIGS. 3 and 4 show the support 1 with cooling channels 2. The support 1 is composed of an annular element 21 provided with a hub part 22 at its central opening and with a collar part 23 at its outer edge. At the lower side of the annular element 21, a thin plate 24 is attached by means of laser welds 25 in such a pattern that the regions located between the weld seams have a double spiral-shaped configuration, with the ends of the two spirals located opposite each other. After welding, the regions between the laser welds are inflated under pressure by means of a fluid to form a double spiral-shaped cooling channel 2 due to the bulging of the thin plate 24 between the laser welds 25. The feed line 11 divides into a part 11a and a part 11b. The part 11a extends to the outer starting region of one spiral-shaped channel 2, while the part 11b further on terminates in the same channel 2, connecting to the discharge line 18 near its inner end. The other spiral-shaped channel is fed near its inner end by the feed line 26, while the discharge takes place through the line parts 12a and 12b, meeting in the discharge line 12. As is indicated by arrows, the coolant flows in opposite directions in the two channels, which, partly in view of the disposition of the supply and the drain and the material thickness of the annular element 21, ensures a maximally even temperature distribution over the support, so that all product deposited on the annular element, dropwise or batchwise, is cooled down to the same extent.

When the above-described apparatus is employed, the support 1 is first brought to the desired temperature by means of the cooling system. Next, by means of the dispenser 3, pivotable to and fro, the product to be processed is deposited in liquid form on the top surface of the continuously rotating support 1, where the cooling action of the support provides that the product solidifies, which product is then removed from the support 1 by the scraping device 4 and ends up in a receiving device not further shown.

It is understood that many further modifications and variants are possible within the purview of the invention as laid down in the appending claims. For instance, within the casing 8, several annular elements can be disposed, each having its cooling, dispenser and scraper. Further, both the configuration of the cooling channels and the number thereof can be modified as required, while the cooling channels can also be realized in another manner than described. Similarly, the dispenser and the scraper can be constructed in any other suitable manner. In this connection, one may for instance think of casting or metal-removing operations and connecting two or more parts detachably or undetachably. Further, if required, means may be present for creating an inert atmosphere within the casing 8 or exhaust means adapted to exhaust vapors and gases that may have been formed during the processing of the product.

We claim:

1. An apparatus for cooling and processing a molten product into a granulate product, said apparatus comprising:

a support consisting of at least one substantially horizontal, disk-shaped element, arranged for rotation about a substantially vertical shaft, the disk-shaped element having a center and an inner edge adjacent the center and an outer peripheral edge, means for depositing the molten product on each disk-shaped element of the support, cooling means for cooling the support to form a solidified product, and means for removing the solidified product from the support in granulate form, characterized in that the cooling means comprise per disk-shaped element first and second, locking, spiral-shaped cooling liquid channels closed in themselves that form part of the disk-shaped element, each spiral-shaped channel having an outer end adjacent the outer peripheral edge and an inner end adjacent the inner edge, the first spiral-shaped channel having an inlet for cooling liquid located adjacent its outer end and an outlet for cooling liquid located adjacent its inner end and the second spiral-shaped channel having an inlet for cooling liquid located adjacent its inner end and an outlet for cooling liquid adjacent its outer end, and feed and discharge means for the cooling liquid extending centrally through the disk-shaped element, the first and second channels being connected to said feed and discharge means without connection to the environment.

2. An apparatus according to claim 1, characterized in that the inlets as well as the outlets of the two channels connect to an annular channel in the vertical shaft.

3. An apparatus according to claim 2, characterized in that the support is composed of a disk-shaped support platform and a thin plate attached locally to the lower side thereof, said plate, after attaching, having been bulged by pressurising by means of a fluid the space between the supporting platform and the thin plate in the regions between the local attachments.

4. An apparatus according to claim 3, characterized in that the thin plate is attached to the supporting platform through laser welding.

5. An apparatus according to claim 4, characterized in that the means of depositing the molten product on the support comprise a dispenser adapted to dispense the molten product batchwise or dropwise.

6. An apparatus according to claim 5, characterized in that the support comprises an annular element and the dispenser is adapted to dispense the molten product in sectors.

7. An apparatus according to claim 6, characterized in that the support consists of a number of disk-shaped elements, vertically arranged one above the other, each comprising cooling channels, dispenser means and means for removing the solidified product in granulate form.

8. An apparatus according to claim 7, characterized in that the support is surrounded by a casing shutting it off from the environment.

9. An apparatus according to claim 1, characterized in that the support is composed of a disk-shaped support platform and a thin plate attached locally to the lower side thereof, said plate, after attaching, having been bulged by pressurising by means of a fluid the space between the supporting platform and the thin plate in the regions between the local attachments.

10. An apparatus according to claim 1, characterized in that the means for depositing the molten product on the support comprise a dispenser adapted to dispense the molten product batchwise or dropwise.

11. An apparatus according to claim 2, characterized in that the means for depositing the molten product on the support comprise a dispenser adapted to dispense the molten product batchwise or dropwise.

12. An apparatus according to claim 3, characterized in that the means for depositing the molten product on the support comprise a dispenser adapted to dispense the molten product batchwise or dropwise.

13. An apparatus according to claim 1, characterized in that the support consists of a number of disk-shaped elements, vertically arranged one above the other, each comprising cooling channels, dispenser means and means for removing the solidified product in granulate form.

14. An apparatus according to claim 2, characterized in that the support consists of a number of disk-shaped elements, vertically arranged one above the other, each comprising cooling channels, dispenser means and means for removing the solidified product in granulate form.

15. An apparatus according to claim 3, characterized in that the support consists of a number of disk-shaped elements, vertically arranged one above the other, each comprising cooling channels, dispenser means and means for removing the solidified product in granulate form.

16. An apparatus according to claim 9, characterized in that the support consists of a number of disk-shaped elements, vertically arranged one above the other, each comprising cooling channels, dispenser means and means for removing the solidified product in granulate form.

17. An apparatus according to claim 1, characterized in that the support is surrounded by a casing shutting it off from the environment.

18. An apparatus according to claim 2, characterized in that the support is surrounded by a casing shutting it off from the environment.

19. An apparatus according to claim 3, characterized in that the support is surrounded by a casing shutting if off from the environment.

20. An apparatus according to claim 9, characterized in that the support is surrounded by a casing shutting it off from the environment.

\* \* \* \* \*

UNITED STATES PATENT AND TRADEMARK OFFICE
CERTIFICATE OF CORRECTION

PATENT NO. : 5,772,187
DATED : Jun. 30, 1998
INVENTOR(S) : Wirodihardjo, et al.

It is certified that error appears in the above-indentified patent and that said Letters Patent is hereby corrected as shown below:

```
Col. 4, line 43:
     delete "," between words second and locking
Col. 5, line 5:
     delete "of" and substitute therefor --for--
```

Signed and Sealed this

First Day of September, 1998

Attest:

BRUCE LEHMAN

*Attesting Officer*     *Commissioner of Patents and Trademarks*